(12) United States Patent
Butsch

(10) Patent No.: US 6,893,375 B2
(45) Date of Patent: May 17, 2005

(54) PLANETARY GEAR WITH LITTLE PLAY

(75) Inventor: Michael Butsch, Daisendorf (DE)

(73) Assignee: Alpha Getriebebau GmbH, Igersheim (DE)

( * ) Notice: Subject to any disclaimer, the term of this patent is extended or adjusted under 35 U.S.C. 154(b) by 12 days.

(21) Appl. No.: 10/296,456

(22) PCT Filed: May 28, 2001

(86) PCT No.: PCT/DE01/01987
§ 371 (c)(1),
(2), (4) Date: Nov. 25, 2002

(87) PCT Pub. No.: WO01/92759
PCT Pub. Date: Dec. 6, 2001

(65) Prior Publication Data
US 2004/0023751 A1 Feb. 5, 2004

(30) Foreign Application Priority Data
May 27, 2000 (DE) .......................... 100 26 354

(51) Int. Cl.⁷ ............................................. F16H 57/08
(52) U.S. Cl. ....................................................... 475/347
(58) Field of Search ................................ 475/346, 347

(56) References Cited
U.S. PATENT DOCUMENTS 3,289,488 A * 12/1966 Breuer ........................ 74/410
3,401,580 A * 9/1968 Hans Sigg ................... 475/344
6,253,589 B1   7/2001 Putz et al.
6,344,009 B1 * 2/2002 Wirz ........................... 475/185

FOREIGN PATENT DOCUMENTS

| DE | 197 29 988 C1 | * | 8/1998 |
| DE | 199 61 788 |   | 6/2000 |
| EP | 0 229 958 A1 | * | 7/1987 |
| GB | 885066 A | * | 12/1961 |
| GB | 1118782 A | * | 7/1968 |

* cited by examiner

Primary Examiner—Dirk Wright
(74) Attorney, Agent, or Firm—Collard & Roe, P.C.

(57) ABSTRACT

The invention relates to a planetary gear with little play that comprises, for one stage of reduction each, at least one sun wheel, an elastically deformable internal geared wheel, planet wheels that are rotatably received by a planetary carrier and that act on the one hand on the sun wheel and on the other hand on the internal geared wheel, thereby transmitting power, and a housing. The aim of the invention is to provide a planetary gear that is simple in design and reliable in operation. To this end, the elastically deformable internal geared wheel is configured as an outer wall zone of the housing.

11 Claims, 2 Drawing Sheets

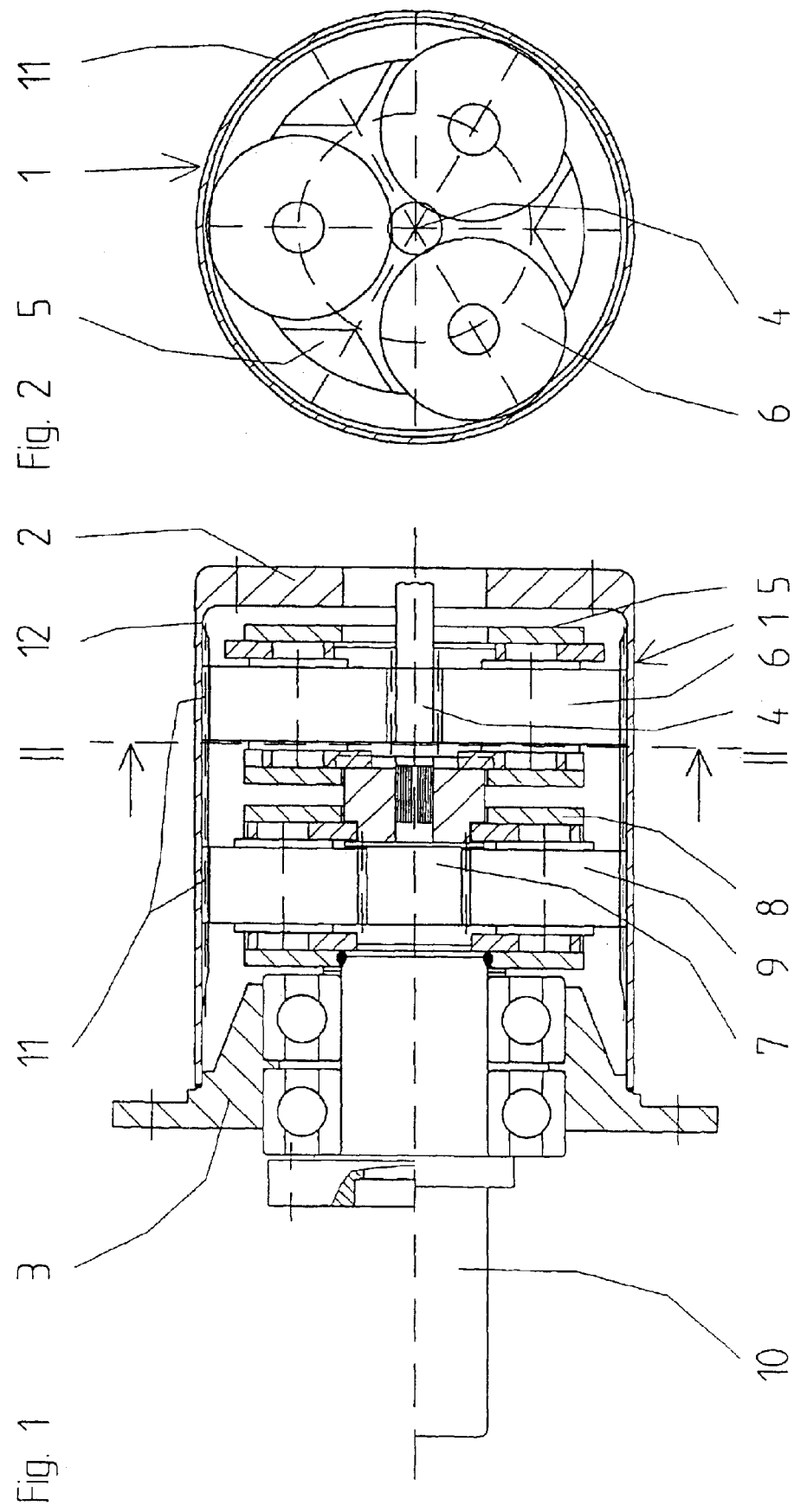

PLANETARY GEAR WITH LITTLE PLAY

CROSS REFERENCE TO RELATED APPLICATIONS

Applicant claims priority under 35 U.S.C. §119 of German Application No. 100 26 354.2 filed May 27, 2000. Applicant also claims priority under 35 U.S.C. §365 of PCT/DE01/01987 filed May 28, 2001. The international application under PCT article 21(2) was not published in English.

BACKGROUND OF THE INVENTION

The invention relates to a planetary gear with little play.

1. Field of the Invention

Such a planetary gear is known from DE 197 29 988 C1.

From EP-A1-229 958, a similar gear is known in which the planetary wheels are held in a bearing arrangement so as to be radially tensioned as a result of elastic deformation of the internal geared wheel. There, the internal geared wheel is an elastic ring which has been inserted in the gear housing.

2. Prior Art

A further similar planetary gear has for example been described in the German patent application DE 199 61 788 A1, lodged on 21.12.1999 and placed open to public inspection on 29.06.2000 with Japanese priority 21.12.1998.

It is the object of the invention to provide such a planetary gear which is particularly simple in design and thus economical to produce, while at the same time being functionally safe and effective, including providing a long service life.

In principle this object is met by an embodiment of a generic planetary gear disclosed herein.

Additional embodiment are also disclosed.

SUMMARY OF THE INVENTION

The invention is based on the general approach of achieving play within the planetary gear by elastic tensioning of the enmeshing wheels of the planetary gear by means of an elastically deformable internal geared wheel. In this arrangement, the internal geared wheel is simply integrated in an outer wall of the gear housing, wherein said outer wall is designed so as to be elastically compliant.

In a particularly advantageous embodiment, the internal geared wheel or geared wheels of a multi-stage gear is/are formed in the circumferential wall of a bowl which serves as a gear housing part. In this arrangement, the bottom of the bowl forms a face flange of the gear. On the open side of the bowl, said bowl is welded to a face of the gear housing, which face is situated opposite the bottom of the bowl. This face can be a connecting flange in which a driven shaft of the gear is held in a bearing arrangement. To ensure adequate elastic deformability in the region of the internal geared wheel in the case of a bowl-shaped gear region, an intermediate region with increased radial compliance can be provided at the face ends of the region of the internal geared wheel, in the respective transition regions to the radial face wall regions of the gear housing. Also, to increase its elastic deformability, the internal geared wheel, of which there is at least one, can comprise slots for example.

The planetary gear according to the invention can be a toothed gear or a friction gear. Further advantageous special embodiments of the invention are also disclosed.

BRIEF DESCRIPTION OF THE DRAWINGS

The drawings show advantageous embodiments by means of which further special features and advantages of the invention are described.

The drawings show the following:

FIG. 1 a longitudinal section of a planetary gear comprising a bowl-shaped housing;

FIG. 2 a section of the gear along line II—II; and

DETAILED DESCRIPTION OF THE INVENTION

Figure 3:
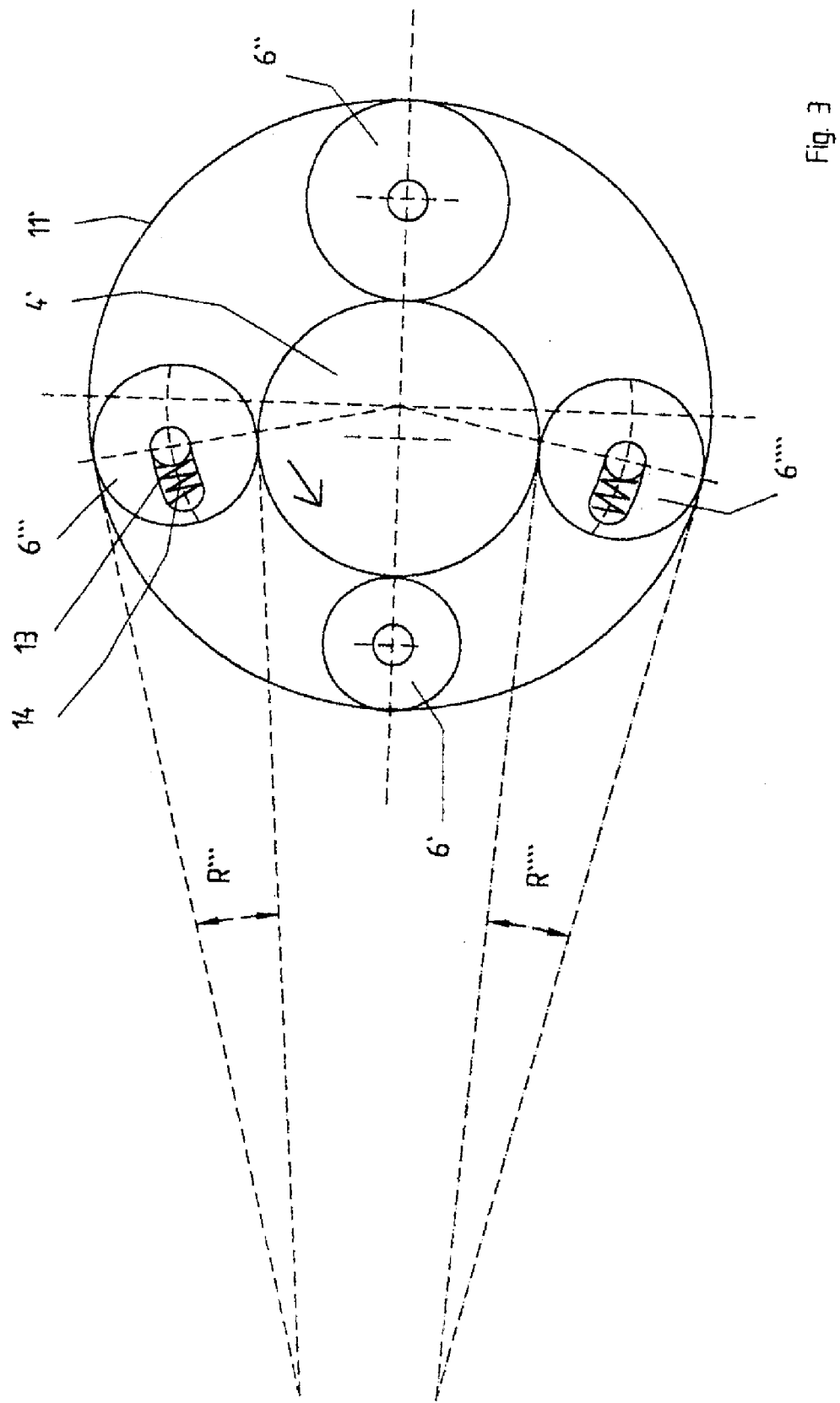
FIG. 3 a section along line II—II of an alternative embodiment of a gear in the form of a friction gear with an eccentrically arranged sun wheel axis in diagrammatic view.

The housing of the planetary gear comprises a bowl-shaped metallic component 1 whose bottom forms a flange, on the drive side, in the shape of a first face wall 2. The circumferential region of the bowl-shaped component 1 practically extends along the entire axial length of the gear. The open rim of the bowl-shaped component 1 is welded to a second face wall 3 of the gear housing, said second face wall 3 being situated on the driven side of the housing and being designed as a driven-side flange on the housing side.

The gear is a two-stage gear. In the first stage, a centrally arranged first sun wheel 4 drives planetary wheels 6 which are rotatably held in a first planetary carrier 5.

The first planetary carrier 5 is connected to a second centrally arranged sun wheel 7 of the second stage of reduction. In this arrangement, the second sun wheel 7 drives second planetary wheels 9 which are rotatably held in a second planetary carrier 8. The second planetary carrier is rigidly connected to a driven shaft 10 radially/axially held in a bearing arrangement on the second face wall 3.

The planetary wheels 6 and 9 from the two gearing stages engage the internal wall regions of a hollow-cylindrical region of the bowl-shaped component 1, each of said internal wall regions being an internal geared wheel 11.

In the embodiment shown in FIG. 1, the enmeshing wheels of the planetary gear are toothed wheels. The two internal gear wheels 11 comprise internal toothing which has been incorporated in the cylindrical outer wall region of the bowl-shaped component 1 by flow turning which provides the following advantages:

- the surface of the internal toothing is very smooth;
- the gear housing can be designed in one piece in the shape of a bowl, with the bottom of the bowl forming a flange on the drive side;
- due to strain-hardening of the wall material of the gear housing having occurred in the case of flow-turned internal toothing, the wall of the gear housing can be very thin;
- with the use of various matrices, various widths of internal toothing can be achieved;
- the length of internal toothing can differ in planetary gears which comprise one stage or at least two stages; and
- in the case of internal toothing, the tips of the teeth can be formed so as to correspond to the fillet of a forming matrix; this results in a very low volume of the engagement sound.

The planetary wheels 6 and 9 were installed in the gear housing with targeted radial prestressing. As a result of this, the thin-walled circumferential region of the bowl-shaped component 1 tangentially elongates and the cross-section deforms from an originally circular shape to a polygonal shape.

The internal toothing needs to be corrected such that despite the deformation, an involute shape of the tooth faces is preserved with sufficient accuracy. With a relatively large diameter of the gear housing, the torsional rigidity is still adequate despite the thinness of the circumferential wall of the gear housing. There must be adequate space between the longitudinal region of the internal toothing, within which region the planetary wheels 6 and 9 engage directly, and the two face walls 2, 3 of the gear. This adequate space is necessary on the one hand so that if at all possible the deformations within the region of the internal geared wheel can no longer have an influence on the face walls 2, 3 (or at least so that the influence is extremely small), and on the other hand so that conversely, the face walls do not impede the deformability of the region of the internal geared wheel.

In particular in the transition region between the internal geared wheel 11 and the first face wall region 2, an axial intermediate region 12 with a circumferential reduction in the wall thickness has been provided. The intermediate region 12 can also be designed in the manner of an expansion bellows Furthermore, in the region of the internal geared wheels 11, deformation-increasing slots can be provided. The above-mentioned measures to ensure or to increase deformation can be applied in one or in both transition regions to the two housing face walls.

By prestressing the planetary wheels 6 and 9, the desired absence of play between the internal toothing and the toothing of these planetary wheels is achieved, with said planetary wheels thus necessarily also enmeshing the sun wheels 4, 7 without any play.

Axial attachment of the two planetary carriers 5 and 8, including the second sun wheel 7, relative to the gear housing, takes place exclusively via the bearing arrangement holding the driven shaft 10.

While the planetary gear according to FIGS. 1 and 2 is a planetary tooth gear, FIG. 3 shows an exemplary embodiment of a friction gear in which the axis of the sun wheel or sun wheels 4' extends eccentrically to the internal geared wheel 11'. The eccentric position of the sun wheel 4' results in a forced tensioning of the four planetary wheels 6', 6", 6'" and 6"" which have been provided in this location, depending on the direction of revolution of an associated planetary carrier (not shown) of one of the planetary wheels 6" or 6"" in an associated wedge-shaped space R'" or R"" respectively. The wedge-shaped spaces R'" and R"" are shown in the drawing by dot-dash lines.

As a result of one of the planetary wheels 6'", 6"" tensioning the internal geared wheel 11', the internal geared wheel 11' overall deforms, thus leading to tensioning of all circumferentially arranged planetary wheels.

In principle, the planetary gear design according to FIG. 3 is also possible with the use of toothed wheels.

In the planetary friction gear shown in the drawing, the two planetary wheels 6'" and 6"", one of which, depending on the direction of rotation of the planetary carrier (not shown), causes the desired tensioning of the internal geared wheel, are arranged so as to be approximately diametrically opposed. The arrangement is positioned in an annular gap R'", R"" of relatively pronounced wedge-shape, said annular gap R'", R"" being situated between the internal geared wheel and the sun wheel 11'; 4'. With the direction of rotation of the sun wheel 4' as shown, only the planetary wheel 6'" exerts a tensioning effect on the internal geared wheel. If the direction of rotation were reversed, this effect would only be exerted by the planetary wheel 6"".

Within the associated planetary carrier (not shown), the planetary wheels 6'" and 6"" which tension the internal geared wheel, are guided so as to be slidable in circumferential direction of the internal geared wheel 11', within an elongated hole 13, which is indicated by a dashed line.

The elongated holes 13 are arranged such that in their initial end stop position, i.e. before any tension, or any increase in the tension, of the internal geared wheel has taken place by displacement of one of these two planetary wheels, the associated planetary wheels 6'" and 6"" when seen in the same circumferential direction, rest against opposite ends of these elongated holes 13. Each of these planetary wheels 6'"; 6"" is tensioned by a spring 14 in the direction of this initial position.

Of the two slidably held planetary wheels 6'", 6"", only that one is transferring moments which due to the direction of rotation of the planetary carrier is situated in its initial end-stop position, i.e. which has not been displaced against a spring 14. The planetary wheel which at the time is not involved in transferring moments (according to the present drawing this is planetary wheel 6'") thus in this state exclusively causes tensioning of the internal geared wheel 11'.

As far as the principle of tensioning the internal geared wheel by slidably held planetary wheels, as described above, is concerned, the design and attachment of the internal geared wheel within the gear or attachment to the face walls of the housing is of no importance. In other words, it is only necessary for the internal geared wheel to be elastically deformable, but not necessarily integrated in the circumferential outer wall of the gear. Rather, the internal gear wheel can be designed as described in DE 199 61 788 A1, mentioned in the introduction.

What is claimed is:

1. A planetary gear with little play comprising, for one stage of reduction each:

a housing;

a sun wheel;

an elastically deformable internal geared wheel which is designed as a single-piece outer wall region in a radial plane of said internal geared wheel; and a plurality of planetary wheels that are rotatably held by a planetary carrier and that act on the one hand on said sun wheel and on the other hand on said internal geared wheel, thereby transmitting power, wherein said plurality of planetary wheels are held in a bearing arrangement so as to be radially tensioned by elastic deformation of said internal geared wheel.

2. The planetary gear according to claim 1, wherein an entire outer wall region of said housing, situated between face ends of a gear housing, is designed so as to be elastically deformable.

3. The planetary gear according to claim 2, wherein in a first face end, said elastically deformable outer wall region makes a transition, in one piece, to a first face wall region which extends approximately perpendicular to an axis of said housing.

4. The planetary gear according to claim 3, wherein in a transition region from an axial outer wall region to at least one of two radial face wall regions an axial intermediate region with increased radial compliance is provided.

5. The planetary gear according to claim 4, wherein said axial intermediate region with increased radial compliance is formed by a circumferential reduction in a wall thickness.

6. The planetary gear according to claim 1, wherein at a second end, said elastically deformable internal geared wheel is welded to a second face wall which delimits a gear housing axially to the outside.

7. The planetary gear according to claim 1, wherein an axis of said sun wheel extends eccentrically in relation to an axis of said internal geared wheel.

8. The planetary gear according to claim 7, further comprising a friction gear comprising at least four planetary wheels wherein two of said at least four planetary wheels are approximately diametrically opposed planetary wheels, slidably held, in a circumferential direction of said internal geared wheel, in a bearing arrangement within an associated planetary carrier, and wherein said two planetary wheels are slidable from a predefined initial end-stop position in different circumferential directions.

9. The planetary gear according to claim 8, wherein in relation to taking up an initial end-stop position, said two slidable planetary wheels are spring-loaded.

10. The planetary gear according to claims 8, wherein said two slidable planetary wheels are situated in a circumferential region of said internal geared wheel in which as a result of an eccentric axial position of said sun wheel and said internal geared wheel a relatively major change in a width of an annular gap between said sun wheel and said internal geared wheel takes place.

11. The planetary gear according to claim 1, wherein a gearing of said internal geared wheel is a flow-turned internal tooth arrangement.

* * * * *